United States Patent [19]
Yang

[11] Patent Number: 6,086,087
[45] Date of Patent: Jul. 11, 2000

[54] MULTI-SEAT STROLLER

[75] Inventor: Chih-Huang Yang, Taichung, Taiwan

[73] Assignee: Ben M. Hsia, Northbridge, Calif.

[21] Appl. No.: 09/437,285

[22] Filed: Nov. 10, 1999

[51] Int. Cl.$^7$ ........................................................ B62B 7/08
[52] U.S. Cl. ...................................... 280/658; 280/47.41
[58] Field of Search .................................. 280/644, 648,
280/642, 643, 650, 658, 47.38, 47.39, 47.4,
47.41, 657

[56] References Cited

U.S. PATENT DOCUMENTS

| | | | |
|---|---|---|---|
| 4,834,415 | 5/1989 | Yee | 280/47.4 |
| 4,886,289 | 12/1989 | Yee et al. | 280/47.4 |
| 5,018,754 | 5/1991 | Cheng | 280/47.4 |
| 5,167,425 | 12/1992 | Cheng | 280/47.4 |
| 5,417,449 | 5/1995 | Shamie | 280/47.4 |
| 5,664,795 | 9/1997 | Haung | 280/47.4 |
| 5,769,448 | 6/1998 | Wang | 280/47.4 |

*Primary Examiner*—Richard M. Camby
*Attorney, Agent, or Firm*—Christensen O'Connor Johnson Kindness PLLC

[57] ABSTRACT

A multi-seat stroller includes a stroller frame having a front wheel-carrying portion, a rear wheel-carrying portion spaced apart from the front wheel-carrying portion in a longitudinal direction and mounted with a rear footrest member, and a seat-mounting portion extending in the longitudinal direction between the front and rear wheel-carrying portions. Each of a non-detachable seat member and a detachable seat member has a backrest portion and a horizontal seat portion provided with a retaining unit for mounting pivotally the backrest portion on the seat portion such that the backrest portion can be selectively disposed in one of a folded state, where the backrest portion overlies the seat portion, and an extended state, where the backrest portion extends vertically from the seat portion. The seat portion of the non-detachable seat member is mounted fixedly on the seat-mounting portion of the stroller frame, whereas the seat portion of the detachable seat member is movably disposed on the seat-mounting portion so as to be spaced apart from the non-detachable seat member in the longitudinal direction. A seat-locking unit is provided on the seat-mounting portion of the stroller frame for retaining removably the seat portion of the detachable seat member on the seat-mounting portion.

15 Claims, 17 Drawing Sheets

MULTI-SEAT STROLLER

BACKGROUND OF THE INVENTION

1. Field of the Invention

The invention relates to a multi-seat stroller, more particularly to one that can accommodate two children in many different ways.

2. Description of the Related Art

Referring to FIG. 1, a conventional twin-seat stroller 10 is shown to comprise a stroller frame 11 having a lower portion provided with four wheels 12. A front seat member 13 is mounted fixedly on a front part of the stroller frame 11, and has a backrest portion 131, a seat portion 132 and a footrest portion 133 that are connected integrally. A canopy 14 is mounted pivotally on an intermediate part of the stroller frame 11 to shield an upper side of the front seat member 13. A rear seat 15 is mounted on the stroller frame 11 behind the front seat member 13. A push handle 16 extends rearwardly and upwardly from the stroller frame 11. Two grip members 17 are mounted respectively on a pair of upright handle portions of the push handle 16. A footrest member 18 is mounted on the lower rear part of the stroller frame 11.

In use, a first child can be seated on the front seat member 13. A second child can be seated on the rear seat 15 with the hands of the second child gripping the grip members 17. Alternatively, the second child can stand on the footrest member 18. Thus, the stroller 10 can accommodate two children in two different ways.

Because the front seat member 13 is fixed to the stroller frame 11, the child seated thereon will always face forwardly and will be unable to see the guardian pushing the stroller 10. As such, it is difficult for the guardian to monitor and comfort the child on the front seat member 13 while pushing the stroller 10 at the same time. Moreover, although the stroller 10 can accommodate two children in two different ways, it does not allow for the children to be seated on the stroller 10 in a face-to-face relationship that would enable them to play with one another. Thus, there is a need to develop a stroller that can enhance interaction between the children and the guardian while the stroller is in use.

SUMMARY OF THE INVENTION

Therefore, the object of the present invention is to provide a multi-seat stroller that can accommodate two children in more than two different ways so as to overcome the aforesaid drawbacks associated with the conventional twin-seat stroller.

According to the present invention, a multi-seat stroller comprises:

- a stroller frame having a front wheel-carrying portion, a rear wheel-carrying portion spaced apart from the front wheel-carrying portion in a longitudinal direction and mounted with a rear footrest member, and a seat-mounting portion extending in the longitudinal direction between the front and rear wheel-carrying portions;
- a non-detachable seat member and a detachable seat member, each having a backrest portion and a horizontal seat portion provided with a retaining unit for mounting pivotally the backrest portion on the seat portion such that the backrest portion can be selectively disposed in one of a folded state, where the backrest portion overlies the seat portion, and an extended state, where the backrest portion extends vertically from the seat portion, the seat portion of the non-detachable seat member being mounted fixedly on the seat-mounting portion of the stroller frame, the seat portion of the detachable seat member being movably disposed on the seat-mounting portion so as to be spaced apart from the non-detachable seat member in the longitudinal direction; and a seat-locking unit provided on the seat-mounting portion of the stroller frame for retaining removably the seat portion of the detachable seat member on the seat-mounting portion.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
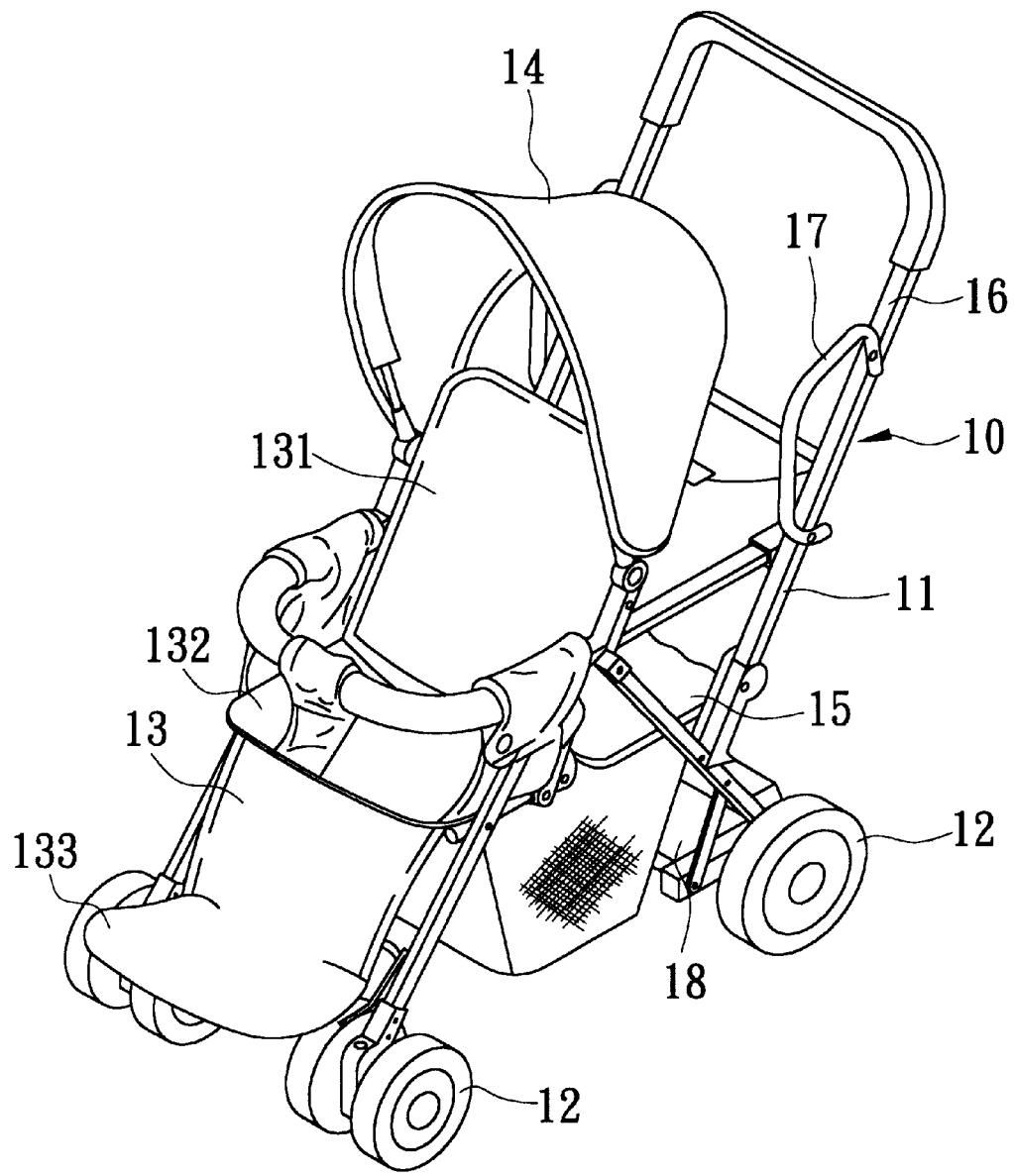
FIG. 1 is a perspective view illustrating a conventional twin-seat stroller.
Figure 2:
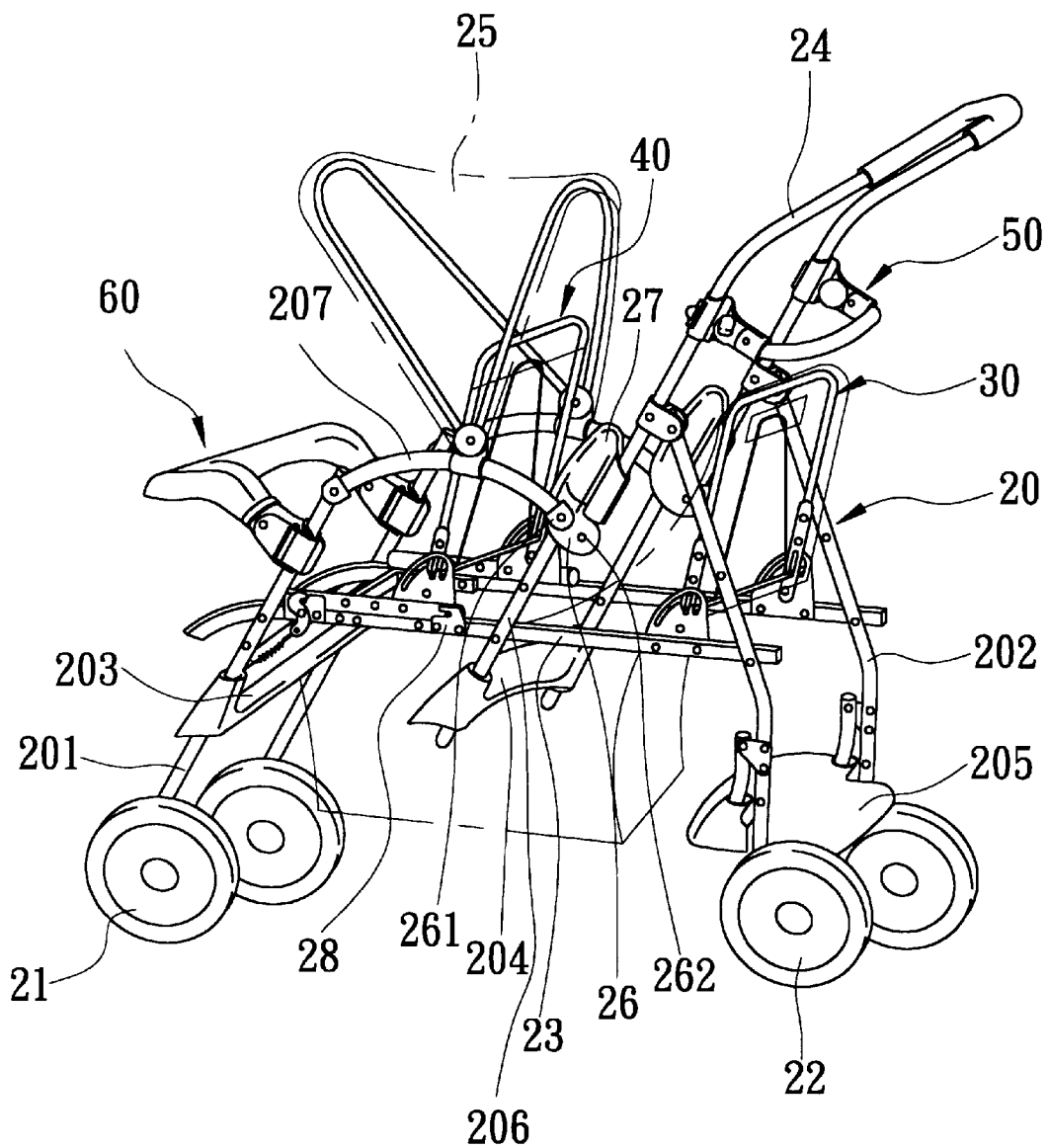
FIG. 2 is an assembled perspective view illustrating the preferred embodiment of a multi-seat stroller according to the present invention.
Figure 3:
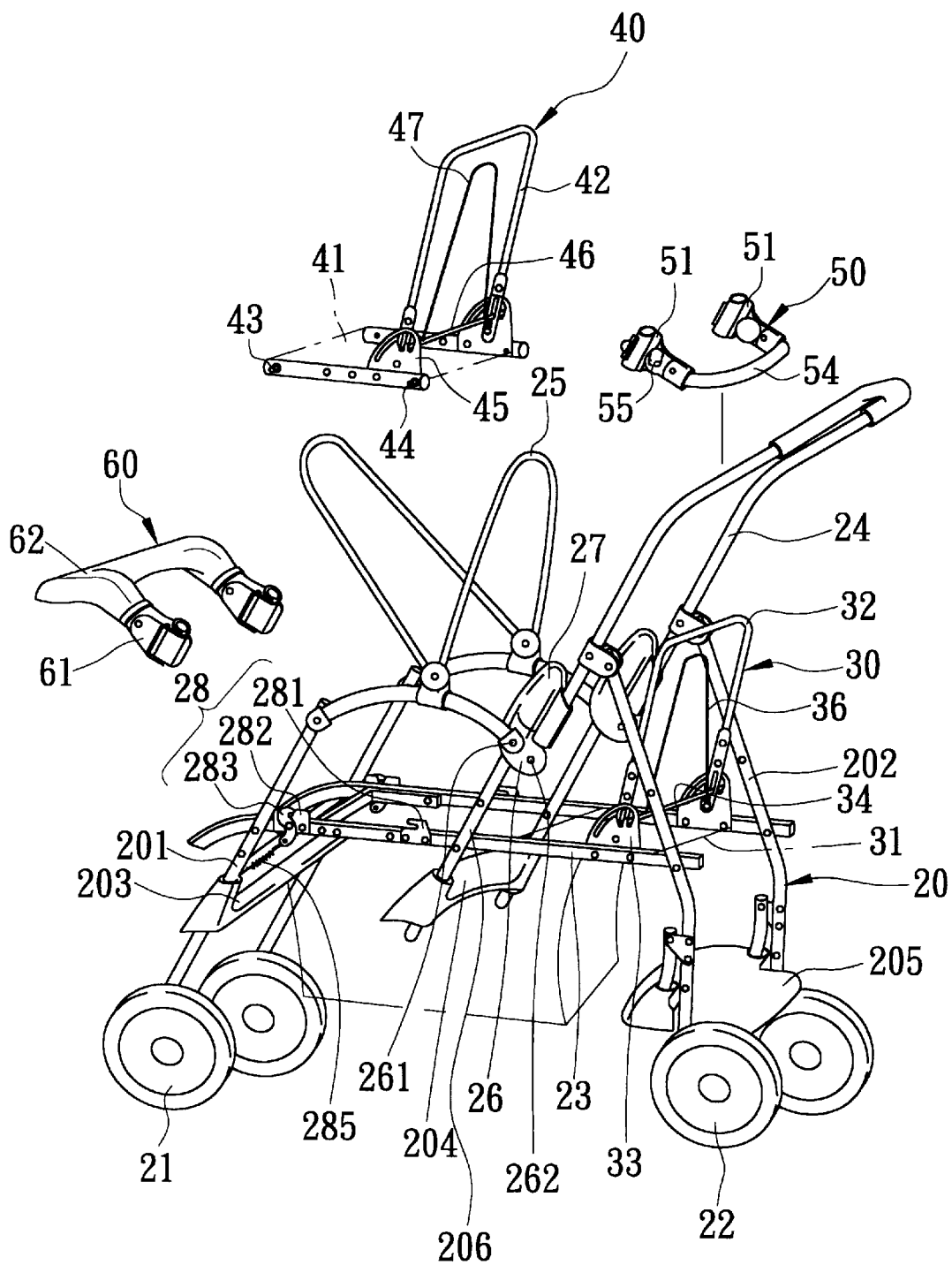
FIG. 3 is an exploded perspective view of the preferred embodiment.

Referring to FIGS. 2 and 3, the preferred embodiment of a multi-seat stroller according to the present invention is shown to comprise a stroller frame 20, a non-detachable seat member 30, a detachable seat member 40, a hand grip member 50, and a tray frame member 60. Each of the non-detachable seat member 30 and the detachable seat member 40 is constructed using known rod-like frame members that are provided with a cloth covering. For the sake of simplicity, the cloth coverings are either omitted from or illustrated using phantom lines in the drawings.

The stroller frame 20 has a front wheel-carrying portion that includes a pair of front wheel-carrying rods 201, a rear wheel-carrying portion that includes a pair of rear wheel-carrying rods 202 and a push handle 24, and a seat-mounting portion that includes a parallel pair of seat-mounting bars 23 extending in a longitudinal direction. The front and rear wheel-carrying rods 201, 202 have lower portions provided with front and rear wheels 21, 22 respectively for movement of the stroller frame 20. Each of the seat-mounting bars 23 has a front end connected pivotally to an intermediate portion of a corresponding one of the front wheel-carrying rods 201, and a rear end connected pivotally to an intermediate portion of a corresponding one of the rear wheel-carrying rods 202. Each of a pair of linking bars 206 has an intermediate portion connected pivotally to a corresponding one of the seat-mounting bars 23 between the front and rear ends of the latter. Each of the linking bars 206 further has an upper portion provided with a connecting seat 26. Each of a pair of bridging bars 207 has a front end connected pivotally to an upper portion of a corresponding one of the front wheel-carrying rods 201, and a rear end connected pivotally to the connecting seat 26 on a respective one of the linking bars 206 at a pivot point 261. A collapsible canopy 25 is mounted pivotally on the bridging bars 207. The push handle 24 has a pair of upright handle portions. The intermediate section of each of the upright handle portions of the push handle 24 is connected pivotally to an upper portion of a corresponding one of the rear wheel-carrying rods 201. The lower section of each of the upright handle portions of the push handle 24 is connected pivotally to the connecting seat 26 on a respective one of the linking bars 206 at a pivot point 262. A known spring-loaded locking member 27 is provided slidably on each of the upright handle portions of the push handle 24, and is formed with a socket 271 for engaging removably a stub projection 263 on the connecting seat 26 of the respective one of the linking bars 206 in order to permit retention of the stroller frame 20 in an unfolded state, as shown in FIG. 2.

A front footrest member 203 is mounted on and extends across the front wheel-carrying rods 201 above the front wheels 21. An intermediate footrest member 204 is mounted on and extends across lower portions of the linking bars 206. A rear footrest member 205 is mounted on and extends across the rear wheel-carrying rods 202 above the rear wheels 22.

Figure 5:
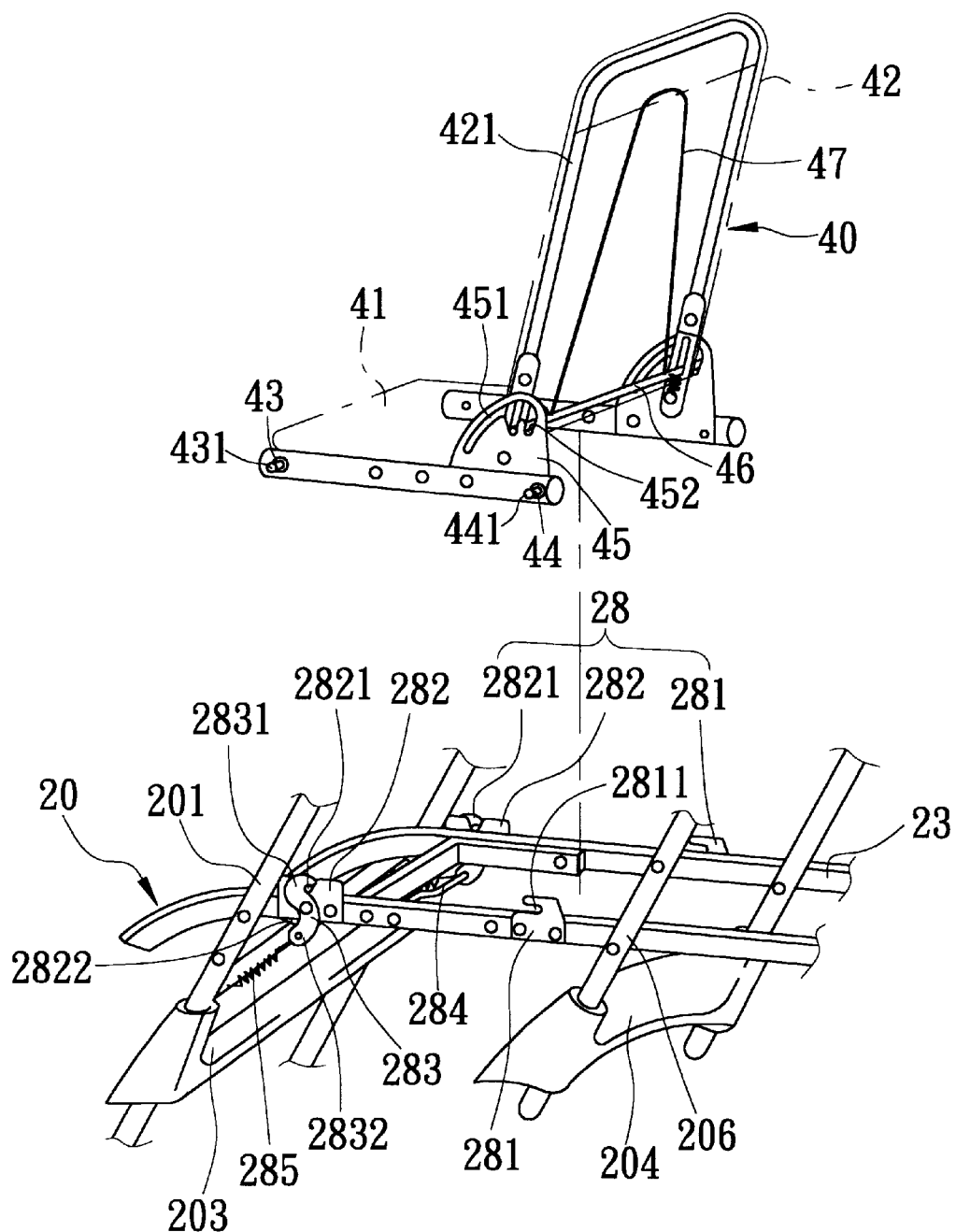
FIG. 5 is a fragmentary exploded perspective view illustrating a stroller frame and a detachable seat member of the preferred embodiment.
Figure 6:
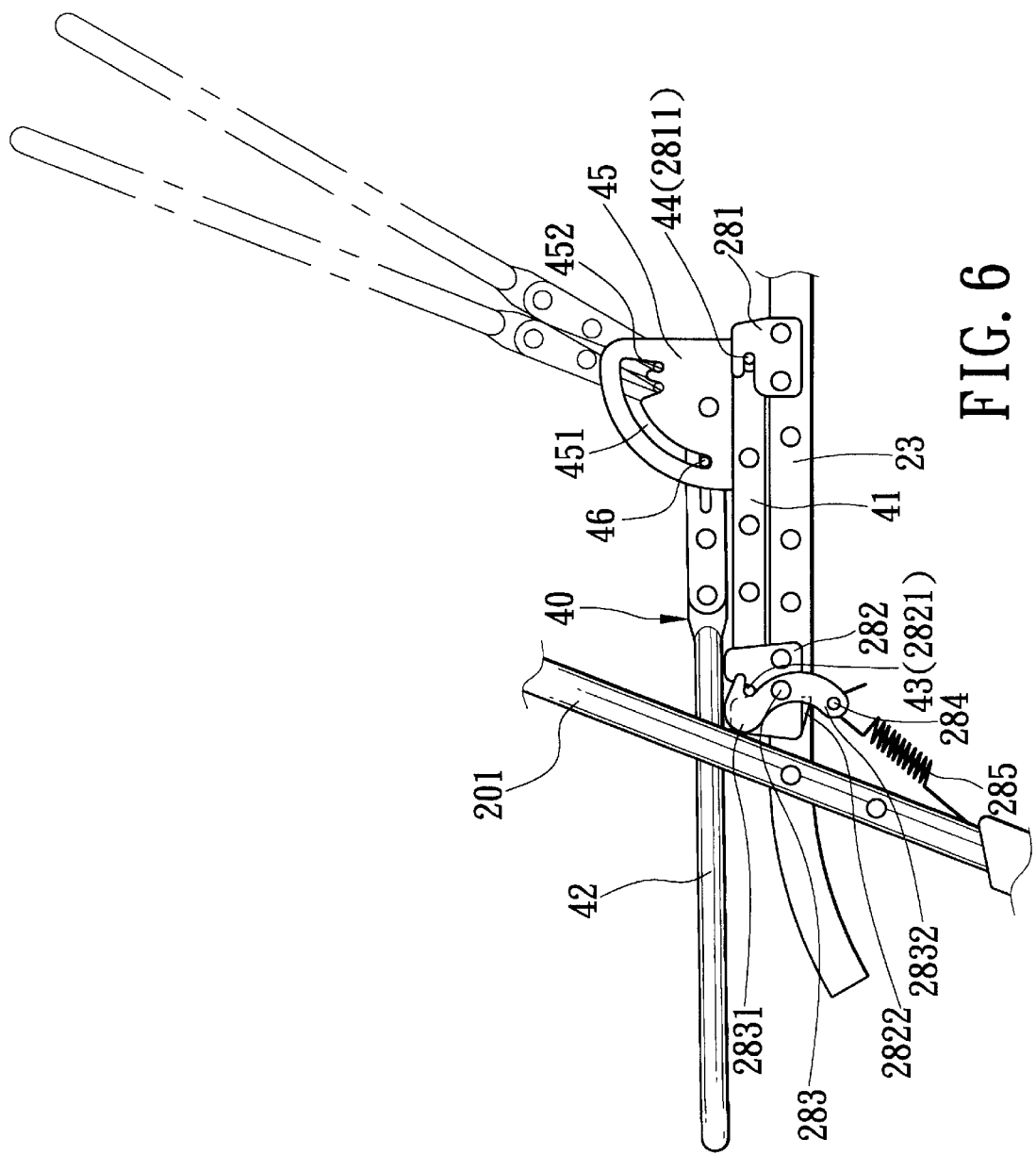
FIG. 6 is a schematic view illustrating the stroller frame and the detachable seat member of the preferred embodiment in an assembled state.
Figure 7:
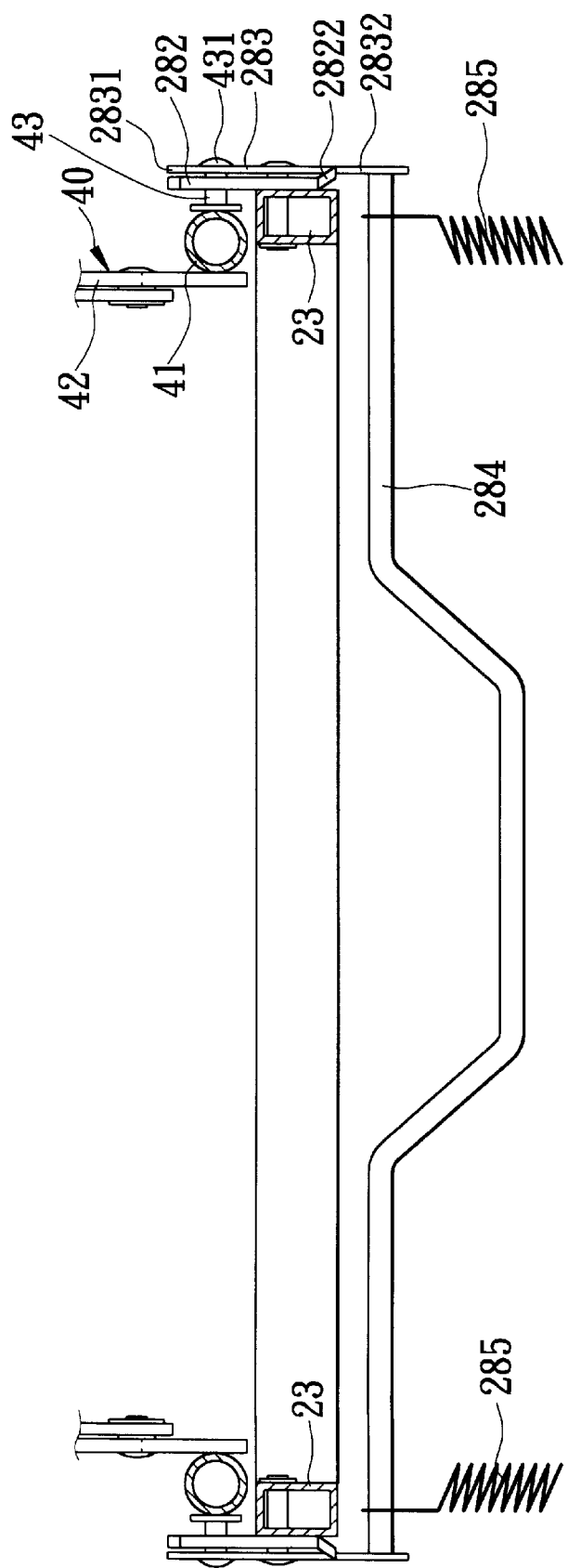
FIG. 7 is a schematic partly sectional view illustrating how a seat-locking unit retains the detachable seat member on the stroller frame.

The linking bars 206 divide the seat-mounting bars 23 of the stroller frame 20 into a front portion and a rear portion. In the preferred embodiment, a seat-locking unit 28 is provided on the front portion of the seat-mounting bars 23. With further reference to FIGS. 5, 6 and 7, the seat-locking unit 28 is disposed on opposite lateral sides of the stroller frame 20, and includes a pair of pivotal retention seats 281, a pair of latch retention seats 282, a pair of generally S-shaped hooking members 283, a release rod 284, and a pair of biasing springs 285. The seat-locking unit 28 is used to retain removably the detachable seat member 40 on the stroller frame 20.

Each of the pivotal retention seats 281 has a lower portion secured on a respective one of the seat-mounting bars 23 adjacent to one of the linking bars 206, and an upper portion formed with a horizontally extending groove 2811 that opens forwardly. Each of the latch retention seats 282 has a lower portion secured on a respective one of the seat-mounting bars 23 adjacent to one of the front wheel-carrying rods 201, and an upper portion formed with a downwardly extending groove 2821. Each of the hooking members 283 has an intermediate portion mounted pivotally on a respective one of the latch retention seats 282, an upper hooking end 2831 disposed adjacent to the downwardly extending groove 2821, and a lower hooking end 2832. The release rod 284 has opposite ends connected to the lower hooking ends 2832 of the hooking members 283. Thus, operation of the release rod 284 will result in simultaneous movement of the hooking members 283. Each of the biasing springs 285 has an upper end connected to the release rod 284, and a lower end connected to a respective one of the front wheel-carrying rods 201. The biasing springs 285 pull the release rod 284 forwardly, thereby causing the upper hooking ends 2831 of the hooking members 283 to pivot rearwardly. The lower portion of each of the latch retention seats 282 is further formed with a lateral stop flange 2822 that normally engages the lower hooking end 2832 of the respective one of the hooking members 283 to limit the rearward pivoting movement of the upper hooking end 2831, thereby disposing the hooking members 283 in a normally closed state, where the upper hooking end 2831 of each of the hooking members 283 extends across the open top side of the respective downwardly extending groove 2821 and cooperates with the same to form a closed latch engaging space.

Figure 8:
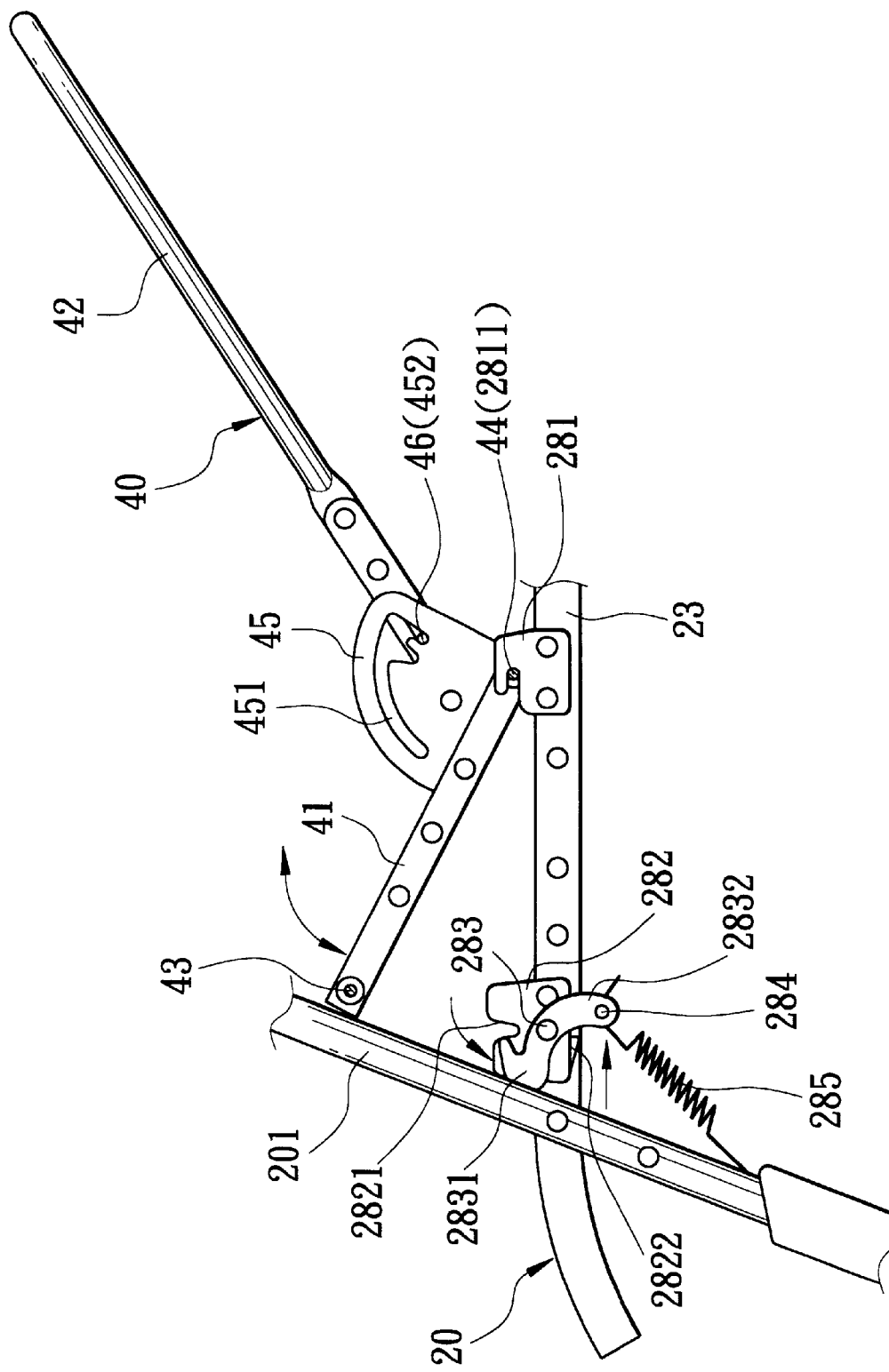
FIG. 8 is a schematic view illustrating how the detachable seat member is removed from the stroller frame.

Referring to FIG. 8, when the release rod 284 is pushed rearwardly against the action of the biasing springs 285, the lower hooking ends 2832 of the hooking members 283 pivot rearwardly, thereby causing the upper hooking ends 2831 to pivot forwardly so as to dispose the hooking members 283 in an opened state, where the upper hooking ends 2831 of the hooking members 283 cease to extend across the open top sides of the downwardly extending grooves 2821.

Figure 9:
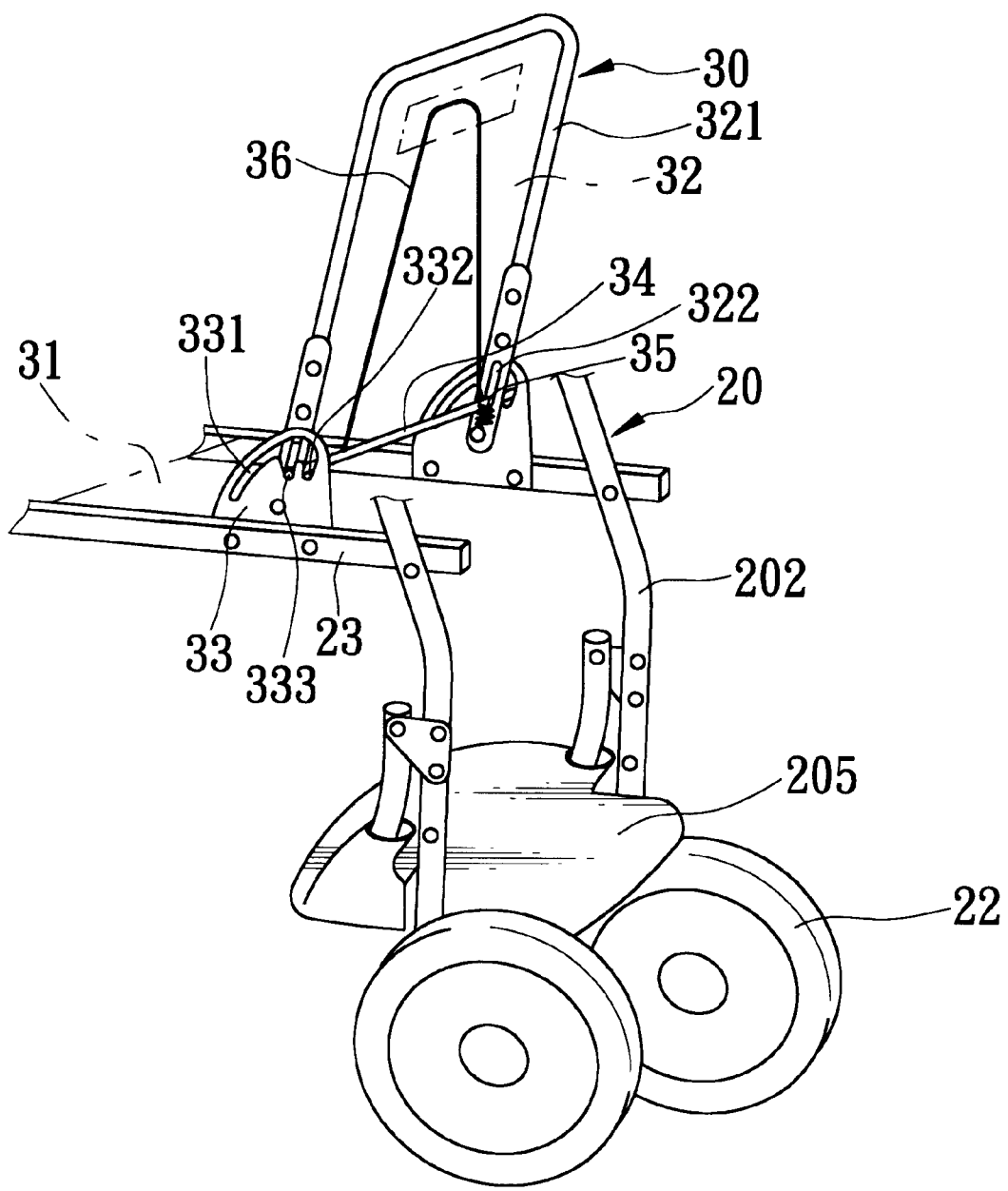
FIG. 9 is a fragmentary perspective view illustrating the stroller frame and a non-detachable seat member of the preferred embodiment.

Referring to FIG. 9, in the preferred embodiment, the non-detachable seat member 30 is disposed on the rear portion of the seat-mounting bars 23 of the stroller frame 20, and includes a horizontal seat portion 31 and a backrest portion 32.

The seat portion 31 is mounted fixedly on the seat-mounting bars 23. The seat portion 31 has a rear end provided with a pair of upright retaining plates 33 at opposite lateral sides, respectively. Each of the retaining plates 33 is formed with a curved slot 331 that curves upwardly and rearwardly. The curved slot 331 has a lower slot-defining edge with an upper rear section that is formed with positioning notches 332, 333. The positioning notches 332, 333 are used to retain the backrest portion 32 at a selected vertical inclination relative to the seat portion 31.

Figure 10:
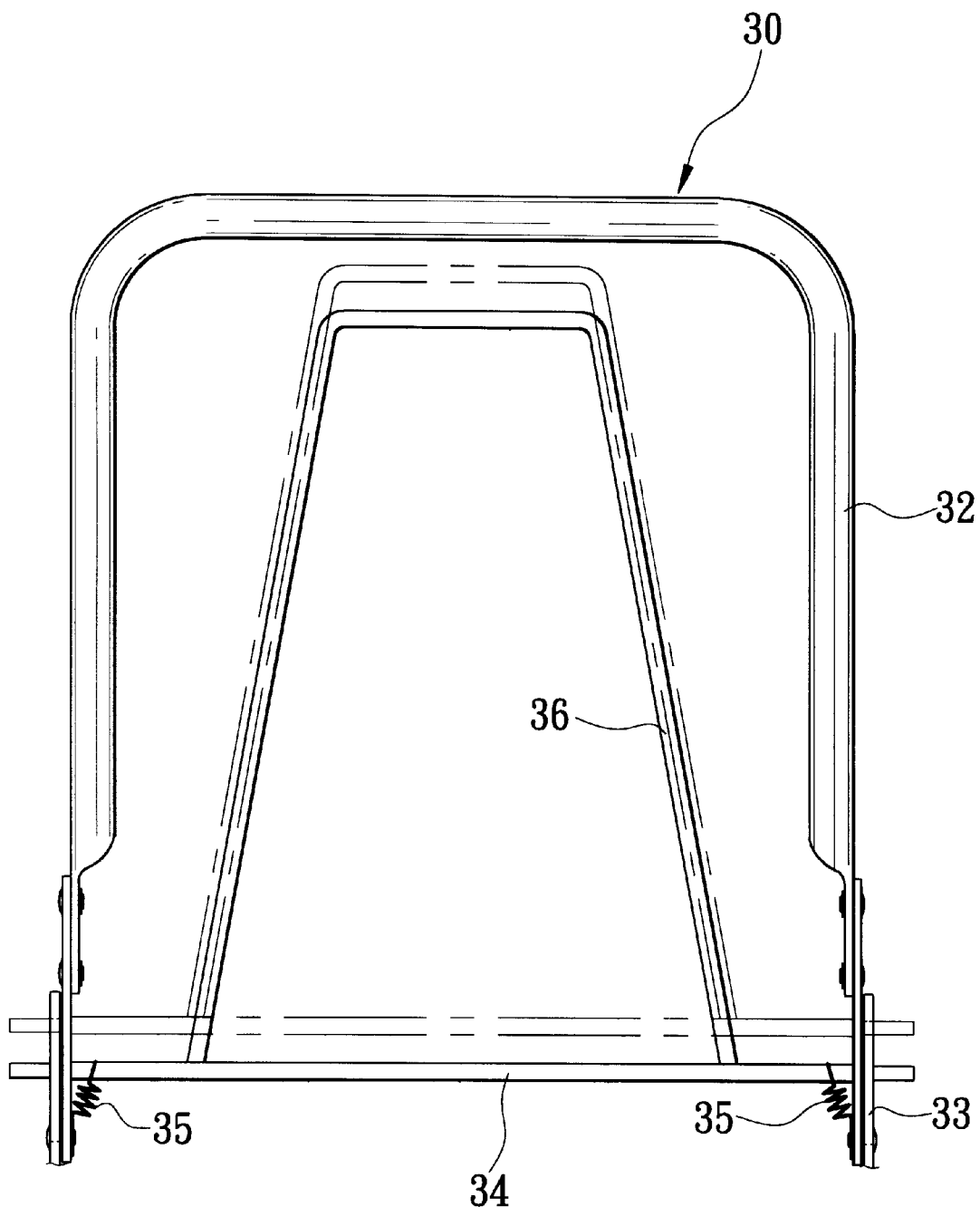
FIG. 10 is a schematic view illustrating a backrest portion of the non-detachable seat member, and a retaining unit for retaining the backrest portion at a desired inclination.

With further reference to FIG. 10, the backrest portion 32 includes a pair of upright lateral frames 321, each of which as a lower section with a distal end mounted pivotally on a respective one of the retaining plates 33. The lower section of each of the upright lateral frames 321 is formed with a slide slot 322 that extends therealong. A retaining rod 34 has opposite ends that extend through the slide slot 322 in a respective one of the upright lateral frames 321 and the curved slot 331 in a respective one of the retaining plates 33. Each of a pair of pull springs 35 has an upper end connected securely to the retaining rod 34 and a lower end connected securely to a respective one of the upright lateral frames 321. The pull springs 35 pull the retaining rod 34 downwardly to establish tight contact between the retaining rod 34 and the lower slot-defining edges of the curved slots 331. A pull handle 36 is connected to the retaining rod 34 and extends transversely therefrom.

By operating the pull handle 36, the opposite ends of the retaining rod 34 can be moved along the curved slots 331 to dispose the backrest portion 32 in one of a folded state, where the backrest portion 32 overlies the seat portion 31 and the opposite ends of the retaining rod 34 do not engage either of the positioning notches 332, 333, and an extended state, where the backrest portion 32 extends vertically relative to the seat portion 31 and the opposite ends of the retaining rod 34 engage a selected one of the positioning notches 332, 333 to retain the backrest portion 32 at a selected vertical inclination relative to the seat portion 31.

Referring back to FIGS. 5 and 6, the detachable seat member 40 similarly includes a horizontal seat portion 41 and a backrest portion 42. The seat portion 41 has front and rear parts formed with respectively with front and rear pairs of latching rods 43, 44 that extend in opposite lateral directions. Each of the latching rods 43, 44 has an enlarged head end 431, 441. When the seat portion 41 is retained on the stroller frame 20 by the seat-locking unit 28, one of the pairs of latching rods 43, 44 engages the pivotal retention seats 281, whereas the other one of the pairs of latching rods 43, 44 engages the latch retention seats 282. To retain the detachable seat member 40 on the seat-mounting bars 23, one of the pairs of latching rods 43, 44 is slid rearwardly into the horizontally extending grooves 2811 in the pivotal retention seats 281 from the open front side of the latter. The seat portion 41 is then pivoted downwardly about said one of the pairs of latching rods 43, 44 until the other one of the pairs of latching rods 43, 44 abuts against the top side of the upper hooking ends 2831 of the hooking members 283. At this time, due to the contour of the upper hooking ends 2831, continued downward pivoting movement of the seat portion 41 will force the upper hooking ends 2831 to pivot forwardly so as to enable the other one of the pairs of latching rods 43, 44 to extend into the downwardly extending grooves 2821 in the latch retention seats 282. Thereafter, the hooking members 283 will move back to the normally closed state by the action of the biasing springs 285 such that the upper hooking ends 2831 of the hooking members 283 restrict upward movement of the other one of the pairs of latching rods 43, 44 inside the downwardly extending grooves 2821. Thus, upward pivoting movement of the seat portion 41 can be arrested by the upper hooking ends 2831 of the hooking members 283 at this time.

When the release rod 284 is pushed rearwardly against the action of the biasing springs 285 so as to dispose the hooking members 283 in the opened state, the upper hooking ends 2831 of the hooking members 283 cease to restrict upward movement of the other one of the pairs of latching rods 43, 44 inside the downwardly extending grooves 2821, as best illustrated in FIG. 8. At this time, the seat portion 41 can be pivoted upwardly about said one of the pairs of latching rods 43, 44 until the other one of the pairs of latching rods 43, 44 ceases to extend into the downwardly extending grooves 2821. Said one of the pairs of latching rods 43, 44 is subsequently slid forwardly and outwardly of the horizontally extending grooves 2811, thereby removing the seat portion 41 from the stroller frame 20.

Like the seat portion 31 of the non-detachable seat member 30, the rear end of the seat portion 41 is provided with a pair of upright retaining plates 45 at opposite lateral sides, respectively. Each of the retaining plates 45 is formed with a curved slot 451 and positioning notches 452. Like the backrest portion 32 of the non-detachable seat member 30, the backrest portion 42 includes a pair of upright lateral frames 421 mounted pivotally on the retaining plates 45. A spring-loaded retaining rod 46 extends between and is slidable along the lateral frames 421, and has opposite ends that extend into the curved slots 451 in the retaining plates 45. A pull handle 47 is connected to the retaining rod 46. Since the manner of disposing the backrest portion 42 in one of a folded state and an extended state is similar to that for the backrest portion 31 of the non-detachable seat member 30, a detailed description of the same will be omitted herein for the sake of brevity.

Figure 11:
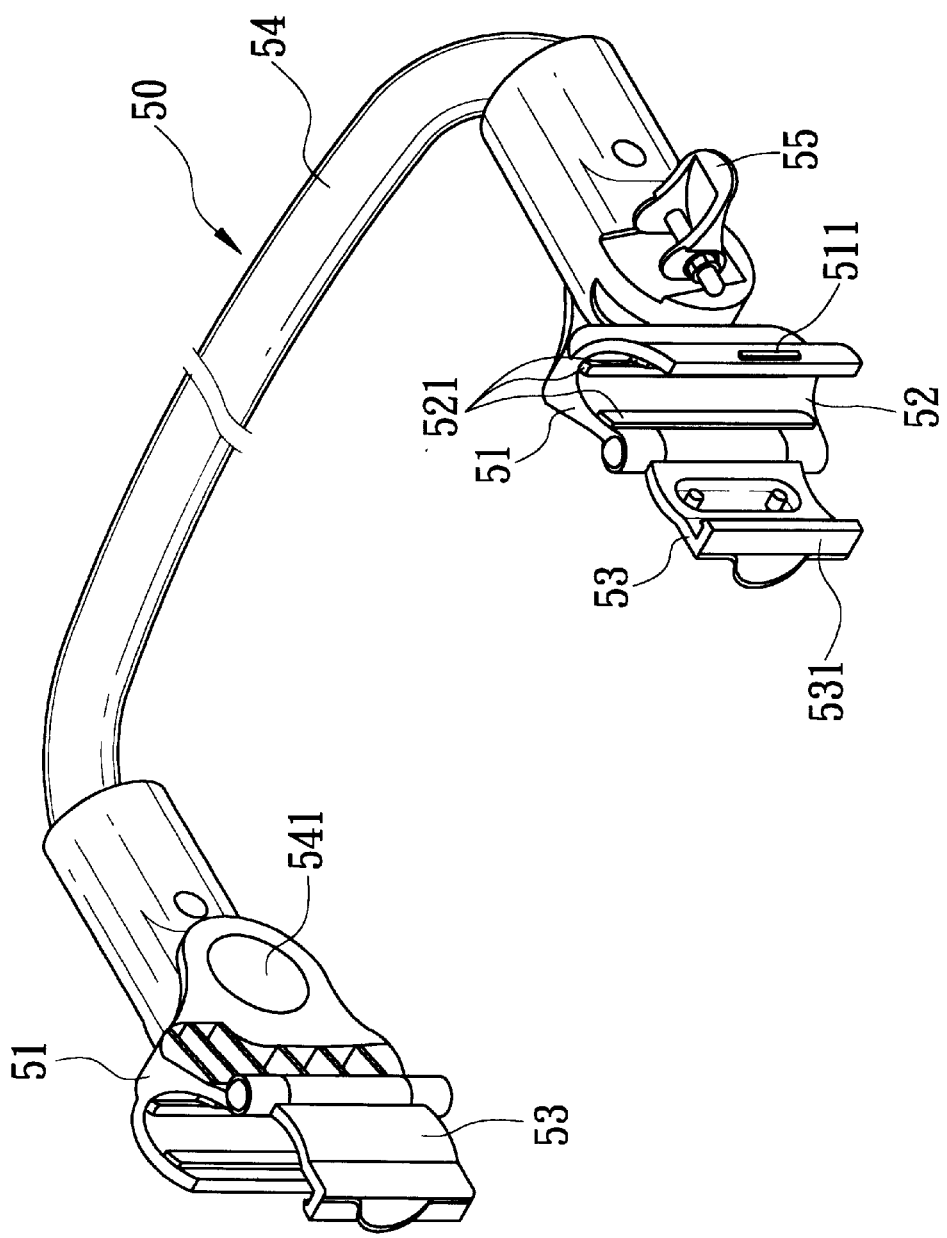
FIG. 11 is a perspective view illustrating a hand grip member of the preferred embodiment.

Referring to FIG. 11, the hand grip member 50 has a clamp portion that includes a pair of clamping seats 51. Each of the clamping seats 51 is formed with a vertically extending clamping groove 52 for engaging a respective one of the upright handle portions of the push handle 24 (see FIG. 3) or a respective one of the rear wheel-carrying rods 202. Preferably, each of the clamping seats 52 has a groove-confining surface formed with a plurality of press strips 521 for pressing tightly against the respective upright handle portion of the push handle 24 or the respective rear wheel-carrying rod 202. One of the lateral sides of each of the clamping seats 51 has a press cover 53 hinged thereto. The other one of the lateral sides of each of the clamping seats 51 has an outward strip projection 511. The press cover 53 has a distal hooking edge 531 for engaging removably the strip projection 511, thereby permitting retention of the hand grip member 50 on the stroller frame 20. The hand grip member 50 further has a U-shaped hand grip portion 54 with opposite ends connected pivotally to the clamping seats 51 about a pair of pivot members 541 (only one is visible in FIG. 11) that are transverse to the clamping grooves 52. Each of a pair of retainers 55 (only one is visible in FIG. 11) is mounted pivotally on a respective one of the clamping seats 51, and is connected to one end of a respective one of the pivot members 541. Each of the retainers 55 has a cam surface for frictional engagement with the respective clamping seat 51. Thus, by pivoting the retainers 55 relative to the clamping seats 51, the hand grip portion 54 can be locked tightly against the clamping seats 51 for retaining the former at a desired angle relative to the latter.

Referring back to FIG. 3, the tray frame member 60 is mounted removably on the front wheel-carrying rods 201 of the stroller frame 20, and includes a pair of clamping seats 61. Since the manner of mounting of the clamping seats 61 on the front wheel-carrying rods 201 is similar to the mounting of the clamping seats 51 of the hand grip manner 50 on the stroller frame 20, a detailed description of the same will be dispensed with herein for the sake of brevity. A tray 62 is mounted on and extends across the clamping seats 61 for placing objects thereon.

Figure 12:
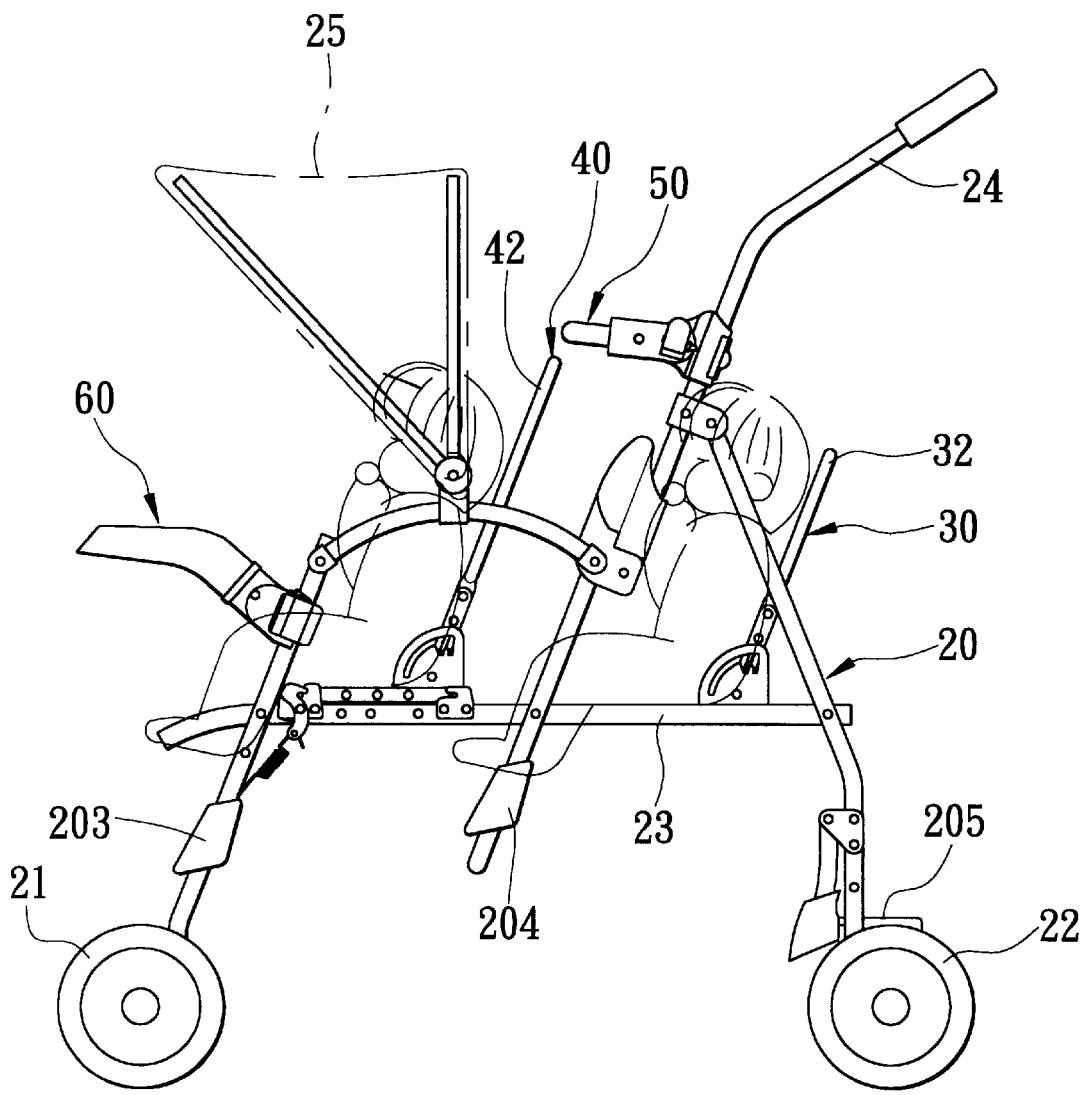
FIG. 12 is a schematic view illustrating the preferred embodiment in a first state of use.

FIG. 12 illustrates the preferred embodiment in a first state of use. As shown, the detachable seat member 40 is mounted on the stroller frame 20 such that the child to be seated thereon can face forwardly.

Figure 13:
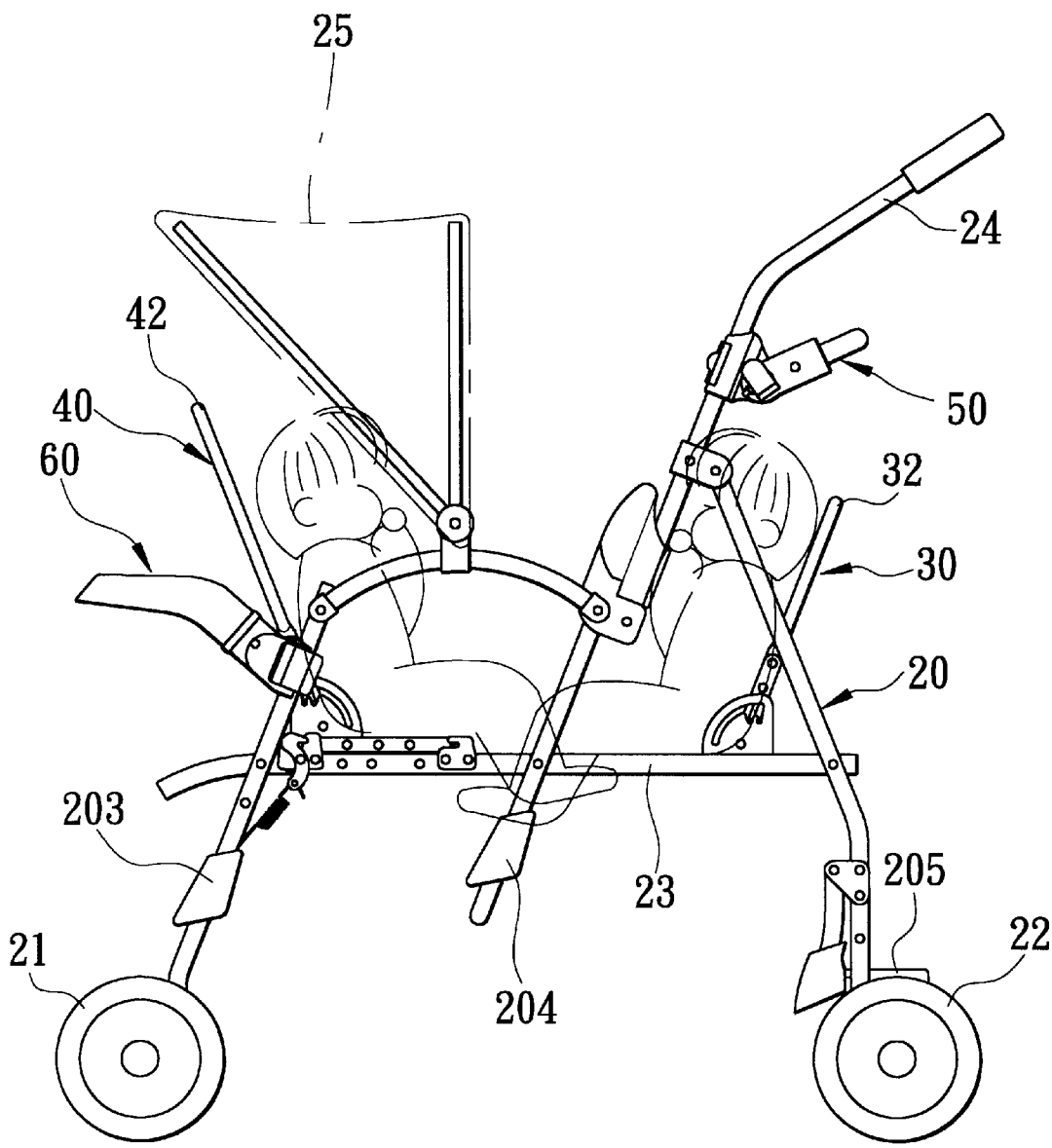
FIG. 13 is a schematic view illustrating the preferred embodiment in a second state of use.

FIG. 13 illustrates the preferred embodiment in a second state of use. As shown, the detachable seat member 40 is mounted on the stroller frame 20 such that the child to be disposed thereon can sit in a face-to-face relationship with another child seated on the non-detachable seat member 30.

Figure 14:
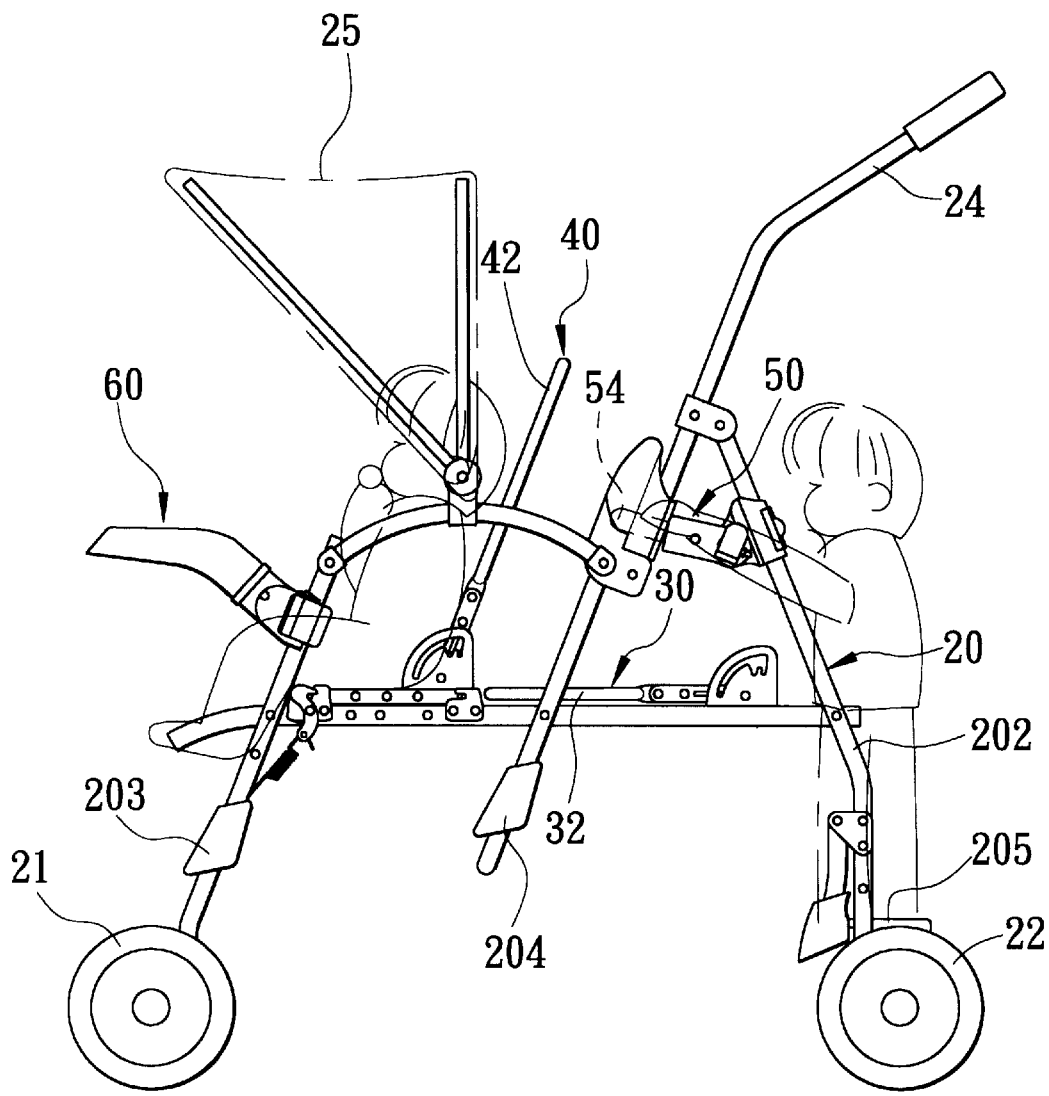
FIG. 14 is a schematic view illustrating the preferred embodiment in a third state of use.

FIG. 14 illustrates the preferred embodiment in a third state of use. As shown, the detachable seat member 40 is mounted on the stroller frame 20 such that the child to be seated thereon can face forwardly. The backrest portion 32 of the non-detachable seat member 30 is disposed in the folded state. Instead of mounting the hand grip member 50 on the upright handle portions of the push handle 24, the hand grip member 50 is mounted on the rear wheel-carrying rods 202. At this time, another child can stand on the rear footrest member 205 with both of his hands gripping at the hand grip member 50.

Figure 15:
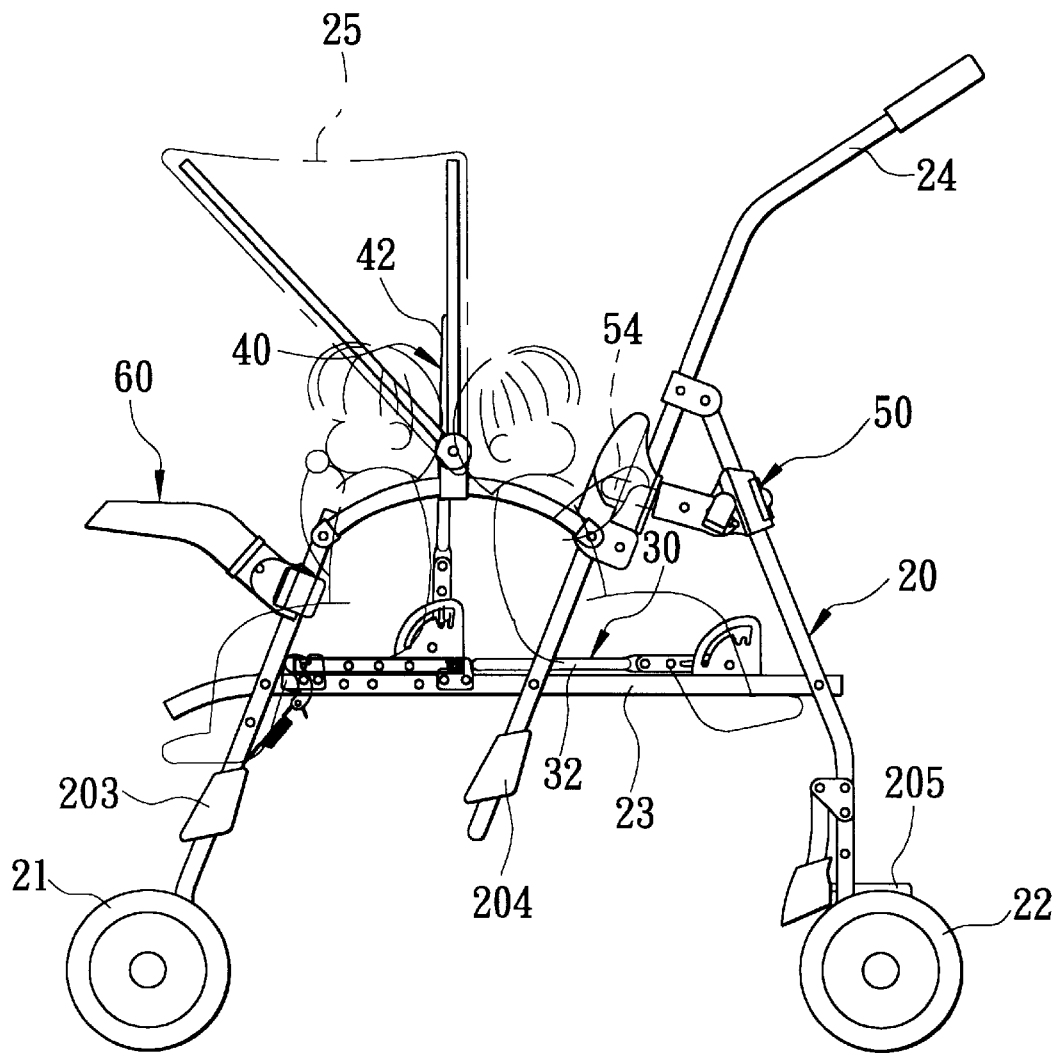
FIG. 15 is a schematic view illustrating the preferred embodiment in a fourth state of use.

FIG. 15 illustrates the preferred embodiment in a fourth state of use. Like the second state of use, the detachable seat member 40 is mounted on the stroller frame 20 such that the child to be seated thereon can face forwardly, the backrest portion 32 of the non-detachable seat member 30 is disposed in the folded state, and the hand grip member 50 is mounted on the rear wheel-carrying rods 202. However, instead of standing on the rear footrest member 205, the other child is seated on the non-detachable seat member 30 so as to face rearwardly and so as to share the backrest portion 42 of the detachable seat member 40 with the child that is seated on the latter. The hands of the child who is seated on the non-detachable seat member 30 can grip the hand grip member 50 at this time.

Figure 16:
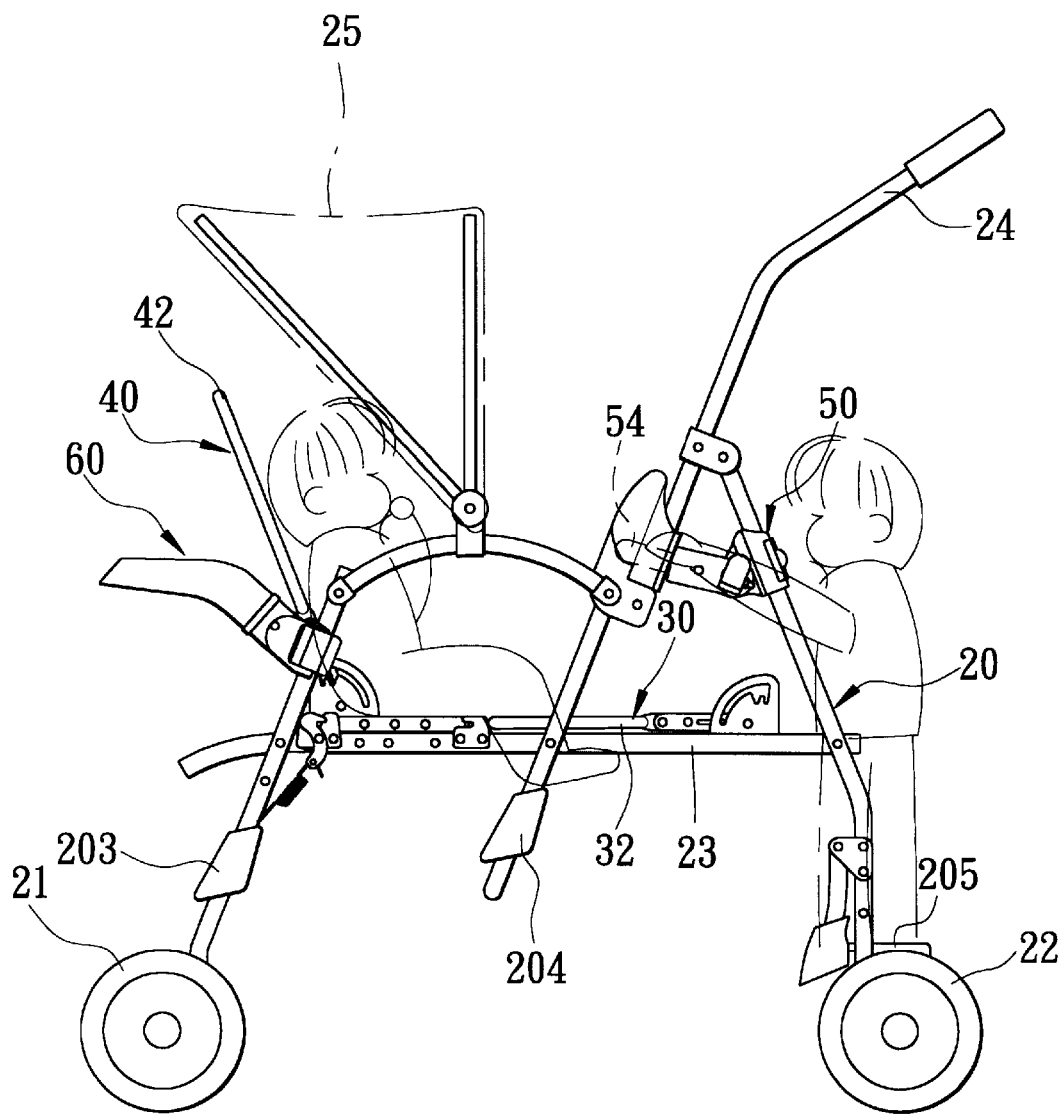
FIG. 16 is a schematic view illustrating the preferred embodiment in a fifth state of use.

FIG. 16 illustrates the preferred embodiment in a fifth state of use. Unlike the state of use shown in FIG. 14, the detachable seat member 40 is mounted on the stroller frame 20 such that the child to be seated thereon can face rearwardly.

Figure 17:
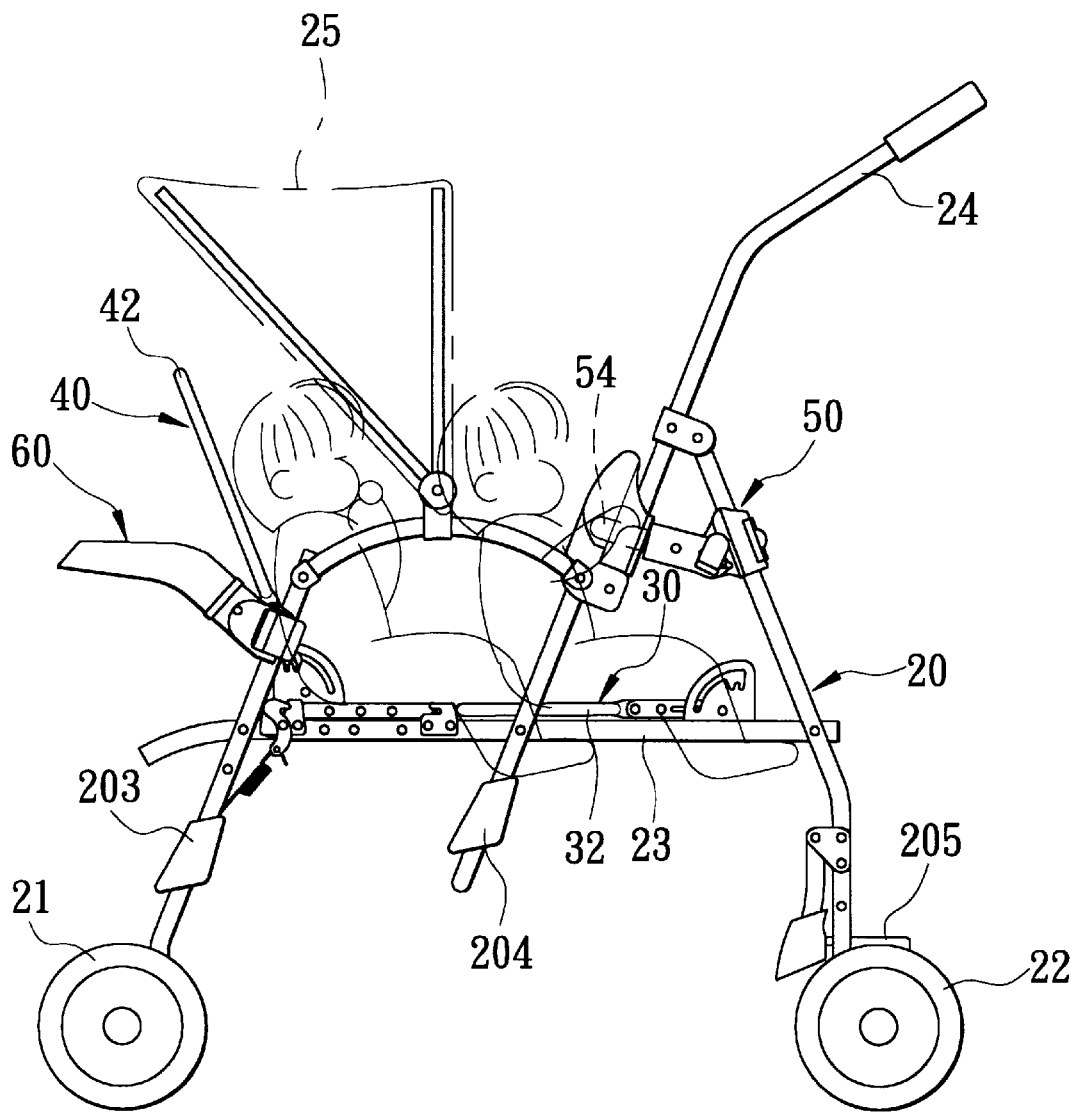
FIG. 17 is a schematic view illustrating the preferred embodiment in a sixth state of use.

FIG. 17 illustrates the preferred embodiment in a sixth state of use. Unlike the state of use shown in FIG. 15, the detachable seat member 40 is mounted on the stroller frame 20 such that the child to be seated thereon can face rearwardly.

Figure 4:
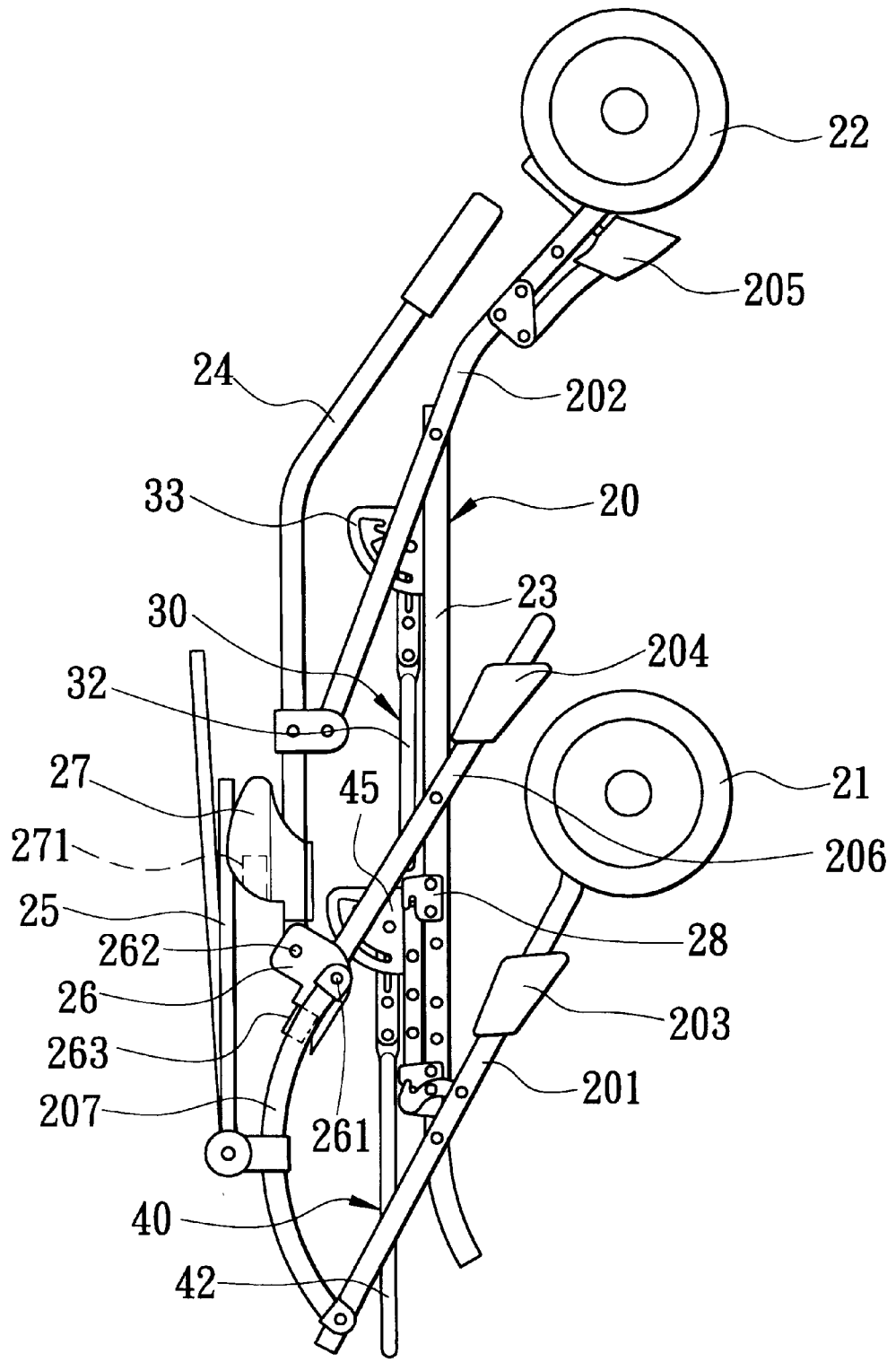
FIG. 4 is a schematic view of the preferred embodiment in a folded state.

Referring once again to FIG. 4, the preferred embodiment can be folded to reduce the storage space requirement thereof and to facilitate transport. To fold the stroller frame 20, the locking members 27 are slid upwardly along the upright handle portions of the push handle 24, thereby disengaging the locking members 27 from the stub projections 263 on the connecting seats 26. The bridging bars 207 can be folded relative to the front wheel-carrying rods 201, and the push handle 24 can be pivoted to a folded state relative to the connecting seats 26 at this time.

It has thus been shown that the multi-seat stroller of this invention can accommodate two children in many different ways that can enhance interaction between the children and the guardian pushing the stroller while the latter is in use. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A multi-seat stroller comprising:
    a stroller frame having a front wheel-carrying portion, a rear wheel-carrying portion spaced apart from said front wheel-carrying portion in a longitudinal direction and mounted with a rear footrest member, and a seat-mounting portion extending in the longitudinal direction between said front and rear wheel-carrying portions;
    a non-detachable seat member and a detachable seat member, each having a backrest portion and a horizontal seat portion provided with a retaining unit for mounting pivotally said backrest portion on said seat portion such that said backrest portion can be selectively disposed in one of a folded state, where said backrest portion overlies said seat portion, and an extended state, where said backrest portion extends vertically from said seat portion,
    said seat portion of said non-detachable seat member being mounted fixedly on said seat-mounting portion of said stroller frame, said seat portion of said detachable seat member being movably disposed on said seat-mounting portion so as to be spaced apart from said non-detachable seat member in the longitudinal direction; and
    a seat-locking unit provided on said seat-mounting portion of said stroller frame for retaining removably said seat portion of said detachable seat member on said seat-mounting portion.

2. The multi-seat stroller as claimed in claim 1, wherein said seat portion of said detachable seat member has front and rear parts formed respectively with front and rear pairs of latching rods that extend in opposite lateral directions for engaging removably said seat-locking unit.

3. The multi-seat stroller as claimed in claim 1, wherein said seat-locking unit includes:
    a pair of pivotal retention seats mounted on said seat-mounting portion and spaced apart from each other in a transverse direction that is transverse to the longitudinal direction, said pivotal retention seats being formed with a respective horizontally extending groove for engaging slidably, pivotally and removably one of said front and rear pairs of latching rods;
    a pair of latch retention seats mounted on said seat-mounting portion and spaced apart from each other in the transverse direction, said latch retention seats being further spaced apart from said pivotal retention seats in the longitudinal direction, and being formed with a respective downwardly extending groove for receiving the other one of said front and rear pairs of latching rods; and
    a pair of hooking members mounted pivotally and respectively on said latch retention seats, said hooking members being movable relative to said latch retention seats between a closed state, where said hooking members extend across open top sides of said downwardly extending grooves in said latch retention seats for retaining the other one of said front and rear pairs of latching rods on said latch retention seats, and an opened state, where said hooking members cease to extend across the open top sides of said downwardly extending grooves to permit removal of the other one of said front and rear pairs of latching rods from said latch retention seats.

4. The multi-seat stroller as claimed in claim 3, wherein said seat-locking unit further includes:
    a release rod having opposite ends connected respectively to said hooking members; and
    a biasing unit interconnecting said release rod and said stroller frame for applying a biasing force to said release rod so as to dispose said hooking members normally in the closed state.

5. The multi-seat stroller as claimed in claim 4, wherein each of said latch retention seats is formed with a lateral stop flange to limit movement of the respective one of said hooking members toward the closed state.

6. The multi-seat stroller as claimed in claim 1, further comprising a tray frame member mounted removably on said front wheel-carrying portion of said stroller frame.

7. The multi-seat stroller as claimed in claim 1, further comprising a hand grip member mounted removably on said rear wheel-carrying portion of said stroller frame.

8. The multi-seat stroller as claimed in claim 7, wherein said hand grip member has a clamp portion for clamping removably said rear wheel-carrying portion of said stroller frame, a hand grip portion connected pivotally to said clamp portion, and a retainer for retaining said hand grip portion at a desired angle relative to said clamp portion.

9. The multi-seat stroller as claimed in claim 1, wherein said backrest portion includes a pair of upright lateral frames, each of which has a lower section formed with a slide slot that extends therealong, said retaining unit including:

a pair of upright retaining plates mounted respectively on opposite lateral sides of said seat portion, said lower sections of said upright lateral frames of said backrest portion being mounted pivotally and respectively on said retaining plates, each of said retaining plates being formed with a curved slot that curves upwardly and rearwardly, said curved slot having a lower slot-defining edge with an upper rear section that is formed with a positioning notch; and a retaining rod having opposite ends that extend through said slide slot in a respective one of said upright lateral frames of said backrest portion and said curved slot in a respective one of said retaining plates, said opposite ends of said retaining rod being movable along said curved slots to dispose said backrest portion in one of the folded state, where said opposite ends of said retaining rod do not engage said positioning notches in said curved slots in said retaining plates such that said backrest portion can overlie said seat portion, and the extended state, where said opposite ends of said retaining rod engage said positioning notches such that said backrest portion can extend vertically from said seat portion.

10. The multi-seat stroller as claimed in claim 9, wherein said lower slot-defining edge of said curved slot in each of said retaining plates is formed with at least two of said positioning notches to permit retention of said backrest portion in a selected one of at least two vertical inclinations relative to said seat portion in the extended state.

11. The multi-seat stroller as claimed in claim 9, wherein said retaining unit further includes a spring unit interconnecting said retaining rod and said backrest portion and applying a biasing force to said retaining rod for establishing tight contact between said retaining rod and said lower slot-defining edges of said curved slots in said retaining plates.

12. The multi-seat stroller as claimed in claim 9, wherein said retaining unit further includes a pull handle connected to said retaining rod and extending transversely therefrom.

13. The multi-seat stroller as defined in claim 1, wherein:

said front wheel-carrying portion of said stroller frame includes a pair of front wheel-carrying rods, each of which has an upper portion, a lower portion provided with a front wheel, and an intermediate portion between said upper and lower portions;

said rear wheel-carrying portion of said stroller frame including a pair of rear wheel-carrying rods, each of which has an upper portion, a lower portion provided with a rear wheel, and an intermediate portion between said upper and lower portions, said rear wheel-carrying portion further including a push handle having a pair of upright handle portions, each of which has an intermediate section connected pivotally to said upper portion of a corresponding one of said rear wheel-carrying rods, and a lower section;

said seat-mounting portion of said stroller frame including a pair of seat-mounting bars, each of which has a front end connected pivotally to said intermediate portion of a corresponding one of said front wheel-carrying rods, and a rear end connected pivotally to said intermediate portion of a corresponding one of said rear wheel-carrying rods;

said stroller frame further including a pair of linking bars, each of which has an intermediate portion connected pivotally to a corresponding one of said seat-mounting bars between said front and rear ends thereof, and an upper portion provided with a connecting seat, said lower section of each of said upright handle portions of said push handle being connected pivotally to said connecting seat on a respective one of said linking bars, a pair of bridging bars, each of which has a front end connected pivotally to said upper portion of a corresponding one of said front wheel-carrying rods, and a rear end connected pivotally to said connecting seat on a respective one of said linking bars, and a pair of locking members provided movably and respectively on said upright handle portions of said push handle and operable so as to engage said connecting seat on a respective one of said linking bars to retain said stroller frame in an unfolded position.

14. The multi-seat stroller as claimed in claim 13, wherein:

said rear footrest member is mounted on and extends across said rear wheel-carrying rods above said rear wheels;

said front wheel-carrying rods are mounted with a front footrest member above said front wheels; and said linking bars have lower portions mounted with an intermediate footrest member.

15. The multi-seat stroller as claimed in claim 13, wherein said stroller frame further includes a collapsible canopy mounted pivotally on said bridging bars.

* * * * *

UNITED STATES PATENT AND TRADEMARK OFFICE
CERTIFICATE OF CORRECTION

PATENT NO. : 6,086,087
DATED : July 11, 2000
INVENTOR(S) : C.-H. Yang

It is certified that error appears in the above-identified patent and that said Letters Patent is hereby corrected as shown below:

| COLUMN | LINE | ERROR |
|---|---|---|
| [73] Pg. 1, col. 1 | Assignee | "Northbridge" should read --Northridge-- |

Signed and Sealed this

Eighth Day of May, 2001

Attest:

NICHOLAS P. GODICI

Attesting Officer    Acting Director of the United States Patent and Trademark Office